United States Patent [19]

Beneteau

[11] Patent Number: 4,805,254
[45] Date of Patent: Feb. 21, 1989

[54] CONNECTING DEVICE FOR A WIPER SYSTEM

[75] Inventor: Christian Beneteau, Gorcy, France

[73] Assignee: Champion Spark Plug Europe S.A., Binche, Belgium

[21] Appl. No.: 76,006

[22] Filed: Jul. 21, 1987

[30] Foreign Application Priority Data

Jul. 23, 1986 [FR] France .................................. 86 10686

[51] Int. Cl.⁴ ................................................. B60S 1/40
[52] U.S. Cl. ................................ 15/250.32; 15/250.42
[58] Field of Search ........... 15/250.21, 250.23, 250.31, 15/250.32, 250.35, 250.42

[56] References Cited

U.S. PATENT DOCUMENTS 3,404,423  10/1968  Howard et al. .................... 15/250.23
4,318,200   3/1982  Bauer et al. ....................... 15/250.32

FOREIGN PATENT DOCUMENTS 2753117   6/1979  Fed. Rep. of Germany ... 15/250.32
2816206  10/1979  Fed. Rep. of Germany ... 15/250.32
8305813.3  9/1984  Fed. Rep. of Germany .
612614   11/1948  United Kingdom ............. 15/250.32
832466   12/1960  United Kingdom .
977607    9/1964  United Kingdom .

Primary Examiner—Peter Feldman
Attorney, Agent, or Firm—Wood, Dalton, Phillip, Mason & Rowe

[57] ABSTRACT

The invention relates to a connecting device for a wiper system of motor vehicles wherein the wiper system comprises a wiper arm (not shown) of which the front end is articulated to the superstructure (1) of the wiper blade in its medium portion and which comprises a control arm (4) of which the front end is articulated to said superstructure (1) at its rear end. The connecting device between the control arm (4) and the superstructure (1) consists of two elements (5, 6) of which one (5) is made of an elastomer material which has an elongate form and which is locally provided with a reduced transverse section (5a). This reduced transverse section (5a) allows the control arm (4) to take different angular positions with respect to the superstructure (1) of the wiper blade.

10 Claims, 1 Drawing Sheet

CONNECTING DEVICE FOR A WIPER SYSTEM

BACKGROUND OF THE INVENTION

The present invention relates to a connecting device for a wiper system which comprises a wiper arm of which the front end is articulated to the superstructure of the wiper blade in its medium portion and which comprises a control arm of which the front end is articulated to said superstructure at its rear end.

Wiper systems of the thus defined type are well known in prior art, just as the fact that these systems allow the surface to be wiped by the wiper blade to be increased with respect to the wiper systems which are not provided with a control arm.

British Pat. Nos. 832,466 and 977,607 may be mentioned by way of example. However, neither these two patents nor any other patent known to the applicant show the constructive details of the articulation between the front end of the control arm and the rear end of the superstructure of the wiper blade.

On a flat windshield the articulation between the control arm and the superstructure of the wiper blade may possibly consist of a simple pivot connection. This, however is no longer true for a curved windshield. Indeed, because of the torsional forces which are transmitted to the articulation or connection by the control arm, it is indispensable that said articulation is a ball-joint type articulation.

If on a curved windshield the ball-joint type solution seems to be an adequate solution at first sight, it is however to be noted that the ball-joint connection, which is well known in some other wiper systems, has at least the following disadvantages:

it is relatively complex if it is designed for a perfect working over a sufficiently long period, for ensuring a sufficiently long life period it is necessary to use special materials, because of its complexity and because of the use of special materials it is relatively expensive.

SUMMARY OF THE INVENTION

The object of the invention is to provide a wiper system of the above defined type—and in particular to provide a connecting device between the control arm and the superstructure of the wiper blade—which eliminates the disadvantages of the ball-joint connections used in prior art in similar wiper systems.

The connecting device according to the invention is substantially characterized by the fact that the articulation between the front end of the control arm and the rear end of the superstructure of the wiper blade consists of two elements of which the first one is made of an elastomer material and of which the second one is made of a substantially rigid material.

BRIEF DESCRIPTION OF THE DRAWINGS

Other characterisitics of the invention will be better understood when reading the following description of two embodiments of the invention in conjunction with the appended drawings, wherein.

DETAILED DESCRIPTION OF THE DRAWINGS

Figure 1:
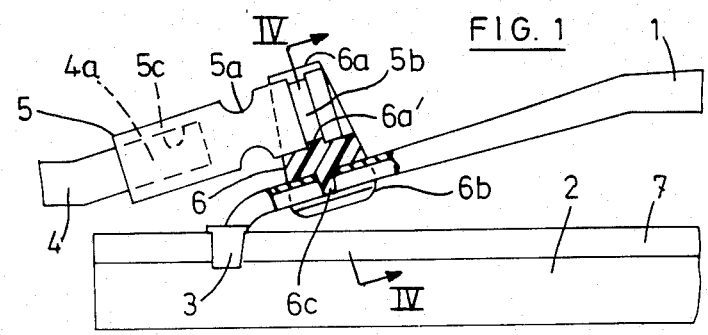
FIG. 1 is an elevational, partially sectional view of the connecting device according to the invention and according to the first embodiment.

FIG. 1 substantially shows the following parts or elements: a portion of the superstructure 1 of the wiper blade, said superstructure being linked to the backing rod 7 by means of the hook 3, the wiping element 2 which is supported by the backing rod 7, a portion of the control arm 4 which is secured to said first element 5 of the connecting device according to the first embodiment and said second elements 6, of said same connecting device, which is secured on the other hand to said first element 5 and, on the other hand, to the superstucture 1 of the wiper blade.

The two elements which constitute the connecting device according to the invention are the elements 5 and 6 of which the first one (5) is made of an elastomer, such as for example a polyester elastomer, and of which the second one (6) is made of a substantially rigid material, such as for example an appropriate plastic material.

The element 5 has an elongate form and is locally (5a) provided with a reduced transverse section of which the configuration is substantially circular. The connection of the element 5 to the front end 4a of the control arm 4 can be executed in different known ways and in particular by cementation or by a snap-on device. In FIG. 1 the front end 4a of the control arm 4 is cemented in the cavity 5c of the element 5.

Figure 4:
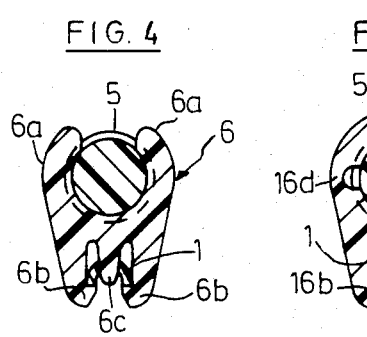
FIG. 4 is a sectional view, along line IV—IV, of the connecting device of FIG. 1.

The element 6 (see also FIG. 4) is secured to the rear end of the superstructure 1 of the wiper blade. This connection can also be executed in different ways and the element 6 can be removable or not removable with respect to the superstructure 1. In FIGS. 1 and 4 the element 6 is secured to the rear end of the superstructure 1 of the wiper blade by a snap-on device.

Said snap-on device comprises a projection 6c which enters into the opening 1a (FIG. 3) provided in the superstructure 1 of the wiper blade as well as two slightly resilient hooks 6b capable of snapping into the bottom surface of the superstructure 1 when said element 6 is pushed from above onto said superstructure.

According to FIG. 1 and FIG. 4 the connection between the two elements 5,6 is also a snap-on connection and comprises two slightly curved and slightly resilient projections 6a which partially surround one of the extremities of the element 5. The axial displacement of the element 5 with respect to the element 6 is prevented by a circularly shaped protuberance 6a' provided on the internal surfaces of said two projections 6a and capable of entering into the corresponding annular recess 5b provided on the element 5.

When, as known in prior art, the wiper arm (not shown) imparts an oscillating movement to the wiper blade, the control arm 4 must be capable of taking different angular positions with respect to the superstructure 1 of the wiper blade. Said different angular positions are made possible by the resilience of the element 5 which, as already said above, is made of an elastomer. The resilience of the element 5 is reinforced by the reduced section 5a and it is in fact this reduced section 5a of the element 5 which constitutes the articulation between the control arm 4 and the superstructure 1 of the wiper blade.

Figure 5:
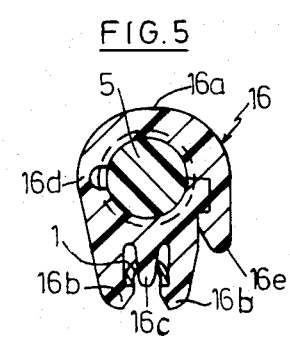
FIG. 5 is a sectional view similar to the one of FIG. 4, but showing a variant.

FIG. 5 shows another system for connecting the first element (5) to the second element (16) of the connecting device according to the invention. The connection of the second element 16 to the rear end of the superstructure 1 of the wiper blade is executed in the same manner as before, i.e. the projection 16c enters into the opening 3 (FIG. 3) provided in the superstructure 1 and the two hooks 16b snap onto the bottom surface of said superstructure. The upper part 16a of the element 16 is connected to its lower part 16b by means of a reduced section 16d which act as an articulation. The element 5 is locked between said upper and lower parts 16a, 16b of the element 16 by means of an annular protuberance/annular recess device similar to the preceding one and by means of the hook 16e which links the upper part 16a to the lower part 16b of the element 16.

Figure 2:
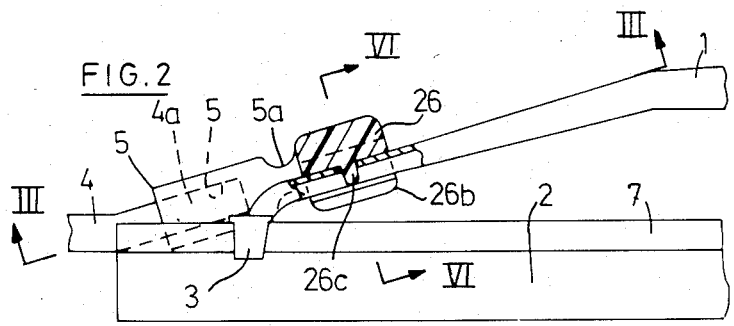
FIG. 2 is an elevational, partially sectional view of the connecting device according to the invention and according to the second embodiment.
Figure 3:
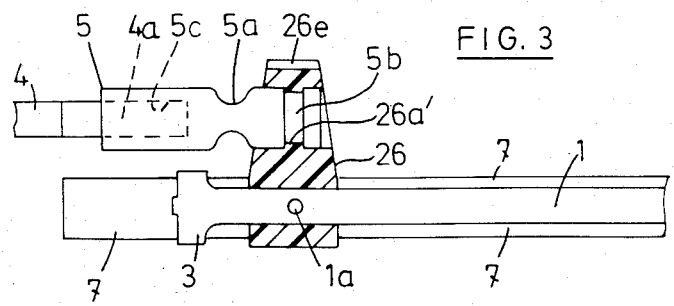
FIG. 3 is a sectional view, along line III—III, of the connecting device of FIG. 2.
Figure 6:
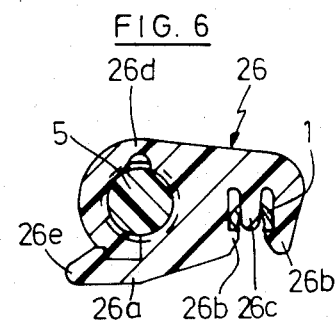
FIG. 6 is a sectional view, along line VI—VI, of the connecting device of FIG. 2.

FIGS. 2, 3 and 6, which relate to the second embodiment of the connecting device according to the invention substantially show the following parts or elements: a portion of the superstructure 1 of the wiper blade, said superstructure being linked to the backing rod 7 by means of the hook 3, the wiping element 2 which is supported by the backing rod 7, a portion of the control arm 4 which is secured to said first element 5 of the connecting device according to the second embodiment and said second element 26, of said same connecting device, which is secured on the one hand to said first element 5 and, on the other hand, to the superstructure 1 of the wiper blade.

In this second embodiment of the element 5 and the way it is secured to the front end of the control arm 4 are exactly the same as in the first embodiment (FIG. 1). Only the relative position of the front end of the control arm 4 and of the element 5 with respect to the superstructure 1 of the wiper blade has been changed. Indeed, in the first embodiment the front end of the control arm 4 and the element 5 are located above the rear end of the superstructure 1 of the wiper blade while in the second embodiment said two elements are located laterally with respect to the rear end of said superstructure.

As can be seen in FIG. 2 and FIG. 6 the connection of the element 26 to the superstructure 1 of the wiper blade is executed in exactly the same manner as shown in FIGS. 4 and 5, i.e. the projection 26c enters into the opening 1a of the superstructure 1 and the two hooks 26b snap onto the bottom surface of said same superstructure.

The connection of the element 5 to the element 26 can principally be executed in the same manner as in the first embodiment. By way of example FIG. 6 shows a connection which is similar to the one of FIG. 5, i.e. the element 26 is made of two parts linked together by the reduced section 26d which acts as an articulation and the hook 26a, 26e locks the element 5 between said two parts by means of an annular protuberance/annular recess device which is identical to that of FIG. 5.

Two embodiments of a new invention have thus been described. It is however evident that modifications can be made, such as for example:

instead of a releasable connection between said elements 5 and respectively 6, 16,26 a non-releasable connection could be provided, and instead of executing said connection in two parts one single elastomer element could be provided instead of said two elements 5 and respectively 6,16,26. The single elastomer element would be substantially elbow-shaped and one of its legs would be secured to the front end of the control arm 4, the other of its legs being secured to the rear end of the superstructure 1 of the wiper blade and the leg which is secured to the front end of the control arm 4 being locally provided with a reduced transverse section.

I claim:

1. A connecting device for a wiper system which comprises a wiper arm of which the front end is articulated to the superstructure (1) of the wiper blade in its medium portion and which comprises a control arm (4) of which the front end (4a) is articulated to said superstructure (1) at its rear end, characterized in that the articulation between the front end of the control arm (4) and the rear end of said superstructure (1) consists of two separate elements (5,6) of which the first one (5) is made of an elastomer material and of which the second one (6) is made of a substantially rigid material, said first element (5) having spaced ends and an elongate form locally provided with a reduced transverse section (5a);

means for securing one end of the first element to the control arm and the other end of the first element to the second element; and means for securing the second element to the rear of the superstructure.

2. A device according to claim 1, characterized in that the reduced transverse section (5a) of the first element (5) has a substantially circular form.

3. A device according to claim 1, characterized in that the means for securing the one end of said first element (5) comprises a cavity (5c) in which the front end of the control arm (4) is secured.

4. A device according to claim 1, characterized in that said means for securing the one end of the first element to the control arm comprises snap-on means.

5. A device according to claim 1 characterized in that said means for securing the other end of the first element to the second element comprises snap-on means.

6. A device according to claim 5 characterized in that said snap-on means comprises two slightly curved and slightly resilient projections (6a) on said second element which partially surround one of the ends of said first element (5).

7. A device according to claim 1 wherein said means securing said second element (6) to the rear end of the superstructure (1) of the wiper blade comprises a projection (6c,16c,26c) which enters into an opening (1a) provided in the superstructure of the wiper blade and two resilient hooks (6b,16b,26b) capable of snapping into the bottom surface of the superstructure (1) when the second element (6) is pushed from above onto said superstructure.

8. A device according to claim 1, characterized in that said first element (5) is located above the rear end of the superstructure (1) of the wiper blade.

9. A device according to claim 1, characterized in that said first element (5) is located laterally with respect to the rear end of the superstructure (1) of the wiper blade.

10. A device according to claim 1, characterized in that the connection between said two elements is a non releasable connection.

* * * * *